Patented July 1, 1924.

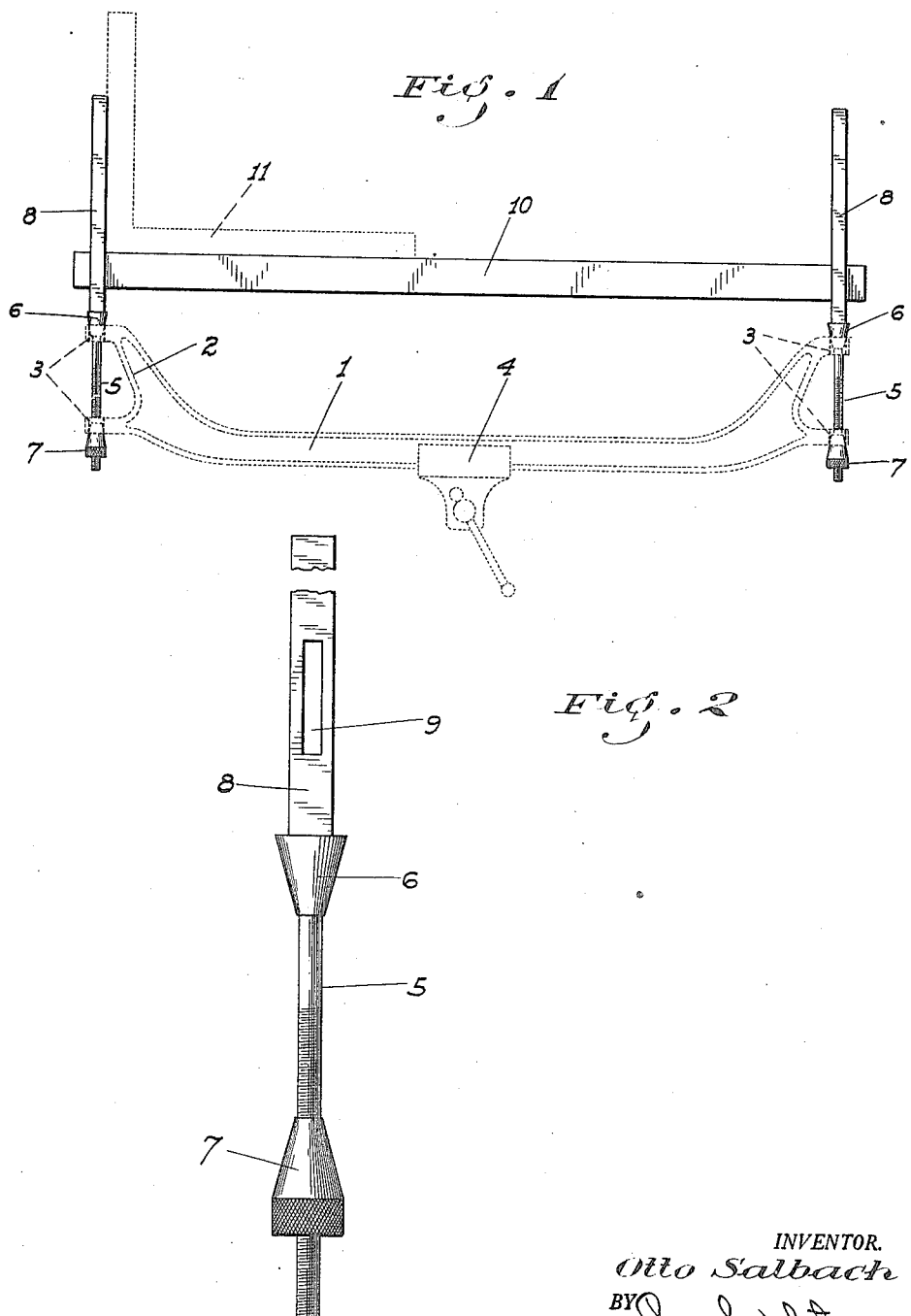

1,499,555

UNITED STATES PATENT OFFICE.

OTTO SALBACH, OF STOCKTON, CALIFORNIA.

AXLE SET.

Application filed February 20, 1922. Serial No. 537,767.

*To all whom it may concern:*

Be it known that I, OTTO SALBACH, a citizen of the United States, residing at Stockton, county of San Joaquin, State of California, have invented certain new and useful Improvements in Axle Sets; and I do declare the following to be a full, clear, and exact description of the same, reference being had to the accompanying drawings, and to the characters of reference marked thereon, which form a part of this application.

This invention relates to improvements in devices for testing the set of axles, and particularly those of motor vehicles, which as universally constructed have at each end a yoke provided with vertically spaced and disposed holes to receive the spindle-bolts.

It is of course essential for proper operation that these bolts should set parallel to each other, both in a plane transversely and longitudinally of the vehicle. In the factory, they are of course jigged to be in true alinement, but after a collision or accident of any kind in which the axle may have been bent or twisted, this alinement is lost and must be restored if the vehicle is to again give good service.

At present, as far as I am aware, there is no device on the market to readily make tests for trueness, and the principal object of my invention therefore is to provide a device by means of which such a test may readily be made, and the extent of the misalinement, if any, of the bolts quickly and easily gauged.

Anther object of my invention is to provide such a device which in a single size may be used for all axles, from that of a Ford to the heaviest truck-axles made.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a front outline of an axle, showing the installation of my device thereon and the method of making a test.

Fig. 2 is a detached view of one of the units used in testing.

Referring now more particularly to the characters of reference on the drawings, the numeral 1 denotes an axle of usual character, having the usual forks 2 at the ends to receive the spindle bolts and bushings therefor through the usual holes 3, the bolts and bushings being removed to apply my device, and the axle being preferably held in a vise 4, a suitable distance from the floor.

Through each pair of holes 3 I pass a threaded rod 5, on the upper end of which is a fixed cone 6 adapted to seat in the upper hole 3.

Another cone 7 is then threaded onto the lower end of the rod until it projects into the lower hole 3, and firmly bites against the edges thereof. The rod then will be truly centered with respect to the pair of holes, the same as the original spindle bolt would be. The rod is of a size to fit the smallest spindle-bolt holes made, while the largest diameter of the cones is such as to take care of the largest holes made. The length of the rod is of course sufficient to take care of any depth of yoke, so that it will readily be seen that this portion of the device will fit any axle from the smallest to the largest.

In true vertical and continuous alinement with the rod 5 is a rigid bar 8, projecting upwardly from the upper cone 6, and provided, preferably adjacent the said cone with a slot 9 adapted to receive a straight edge 10 therethrough, set on edge so as not to bend downwardly.

To make a test, one of the rod and bar units is mounted in each fork 2, with their slots 9 in alinement, so that the straight edge 10 may be slipped through from one to the other and be supported therebetween as shown in Fig. 1.

Now it will be evident that as the holes 3 of each fork are as near exactly equal in size as it is practically possible to make them, and as the fixed cones 6 are duplicates they will project equal distances into their corresponding holes. The bottom edges of the slots 9 are both an equal distance above the cone, so that when the bars and straight edge are in position, the adjacent edge of each bar with the straight edge will subtend an angle of exactly 90° if the axle is true, as may be easily gauged by placing a square 11 against the straight edge and angle, as shown in Fig. 1. If either set of holes 3 is out of transverse vertical alinement, the corresponding bar will lean one way or the other, and the angle between the bar and straight edge will be greater or less than 90°, as the case may be, and the workman will then know in which direction, and to what extent, the axle must be trued up, making another test after performing this operation by any means at his command.

To test for misalinement of the spindle-bolt holes in a plane longitudinally of a vehicle a "sight" is taken from one bar to the other in the usual manner, and if the vertical edges of the bars do not line up perfectly, the workman will at once know that either fork or the axle must be straightened up, and can easily judge the extent of this operation, taking another test after performing the operation, as before. It is of course understood that to be of any value, the bars 8 must be true vertical extensions of the rods 5, and said bars are preferably of rectangular cross section as shown in order principally to facilitate the taking of a sight.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A motor-vehicle axle testing device including a pair of bars, and means for holding and centering said bars in vertical alinement with the spindle-bolt holes of the axle, the bars having means whereby a straight edge may be supported at a common distance on both bars from the adjacent bolt-holes.

2. A motor-vehicle axle testing device including a pair of bars, a rod provided in continuous alinement with each bar, and adapted to pass through the alined spindle-bolt holes of the axle, a fixed cone on each rod adapted to fit into one of said holes, an opposed adjustable cone on each rod adapted to engage the other holes, the bars having means for supporting a straight edge therebetween a common distance on both bars from the adjacent bolt-holes.

3. A motor-vehicle axle testing device including a pair of rigid members adapted to pass through the alined spindle-bolt holes of the axle, a fixed cone on each member adapted to fit into one of said holes, and an opposed cone adjustably threaded onto each rod for engagement with the other hole, said bars being slotted between the fixed cones and the adjacent ends of the bars to support a straight edge therebetween.

4. A motor-vehicle axle-testing device including a pair of bars having means for supporting a straightedge therebetween, and a common means for holding and centering the bars in vertical alinement with the spindle-bolt holes of the axle and for insuring that the straight-edge will always be a common vertical distance on both bars from the adjacent bolt-holes.

In testimony whereof I affix my signature.

OTTO SALBACH.